(12) United States Patent
Kang

(10) Patent No.: US 9,094,680 B2
(45) Date of Patent: Jul. 28, 2015

(54) IMAGE DISPLAY DEVICE

(71) Applicant: LG DISPLAY CO., LTD., Seoul (KR)

(72) Inventor: Hoon Kang, Gyeonggio-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/099,006

(22) Filed: Dec. 6, 2013

(65) Prior Publication Data

US 2014/0098204 A1    Apr. 10, 2014

Related U.S. Application Data

(62) Division of application No. 12/780,341, filed on May 14, 2010, now Pat. No. 8,633,974.

(30) Foreign Application Priority Data

May 15, 2009  (KR) .................. 10-2009-0042407

(51) Int. Cl.
*H04N 13/04*   (2006.01)
*G02B 27/22*   (2006.01)
*G02B 27/26*   (2006.01)

(52) U.S. Cl.
CPC ........ *H04N 13/0434* (2013.01); *G02B 27/2228* (2013.01); *G02B 27/26* (2013.01); *H04N 13/0454* (2013.01)

(58) Field of Classification Search
CPC .............. G02B 27/2228; G02B 27/26; H04N 13/0434; H04N 13/0454; H04N 13/0257; H04N 5/7441; H04N 9/3102; H04N 9/312; H04N 13/0025; G02F 1/13; G02F 1/133; G02F 1/133611; G02F 2201/05; G02F 2001/134345
USPC ............................... 348/58, 51; 345/96; 353/8
See application file for complete search history.

(56) References Cited

U.S. PATENT DOCUMENTS

| | | | |
|---|---|---|---|
| 7,511,877 B2 * | 3/2009 | Kim et al. | 359/296 |
| 2004/0066450 A1 * | 4/2004 | Lee et al. | 348/51 |
| 2005/0212744 A1 * | 9/2005 | Hada et al. | 345/96 |
| 2007/0171343 A1 | 7/2007 | Fukuda et al. | |
| 2007/0242068 A1 | 10/2007 | Han et al. | |
| 2008/0001936 A1 | 1/2008 | Moon | |
| 2009/0079941 A1 * | 3/2009 | Miller et al. | 353/8 |

FOREIGN PATENT DOCUMENTS

| | | |
|---|---|---|
| JP | 2002-185983 | 6/2002 |
| WO | WO 2008100826 A1 * | 8/2008 |

* cited by examiner

*Primary Examiner* — Sath V Perungavoor
*Assistant Examiner* — Xiaolan Xu
(74) *Attorney, Agent, or Firm* — Morgan, Lewis & Bockius LLP

(57) ABSTRACT

An image display device includes an image display panel including a plurality of pixels configured to display a 2D image or a 3D image, a driving circuit configured to apply a data voltage in a 2D image format or a data voltage in a 3D image format to the image display panel, a controller configured to control the driving circuit in a 2D mode for displaying the 2D image or in a 3D mode for displaying the 3D image, and a patterned retarder configured to convert light from the image display panel to alternately have a first polarization and a second polarization, wherein each pixel includes first to fourth subpixels, and the data voltage in the 2D image format is applied to the first to third subpixels and a luminance compensation voltage is applied to the fourth subpixel in the 2D mode, while the data voltage in the 3D image format is applied to the first to third subpixels and a dark gray voltage is applied to the fourth subpixel in the 3D mode.

20 Claims, 14 Drawing Sheets

(a)

(b)

IMAGE DISPLAY DEVICE

This application is a divisional of U.S. patent application Ser. No. 12/780,341, filed on May 14, 2010, which claims the benefit of the Korean Patent Application No. 10-2009-0042407, filed on May 15, 2009, the entire disclosure of each of which is hereby incorporated by reference as if fully set forth herein for all purposes.

BACKGROUND OF THE INVENTION

1. Field of the Invention

The present invention relates to an image display device, and more particularly, to an image display device for displaying a two-dimensional plane image (referred to as '2D image', hereinafter) and a three-dimensional stereoscopic image (referred to as '3D image', hereinafter).

2. Discussion of the Related Art

An image display device displays a 3D image using a stereoscopic technique or an autostereoscopic technique. The stereoscopic technique, which uses a parallax image of left and right eyes of a user with a high stereoscopic effect, includes a glass method and a non-glass method which have been put to practical use. In the glass method, a left and right parallax image is displayed on a direct view-based display device or a projector by changing a polarization direction of the left and right parallax image or in a time division method, and a stereoscopic image is implemented by using polarization glasses or liquid crystal shutter glasses. In the non-glass method, generally, an optical plate such as a parallax barrier or the like for separating an optical axis of the left and right parallax image is installed in front of or behind the display screen.

As shown in FIG. 1, the glass method may include a patterned retarder 5 for converting polarization characteristics of light incident on the polarization glasses 6 from the display panel 3. In the glass method, a left eye image (L) and a right eye image (R) are alternately displayed on the display panel 3, and the polarization characteristics of light incident on the polarization glasses 6 are converted by the patterned retarder 5. Through this operation, the glass method implements a 3D image by spatially dividing the left eye image (L) and the right eye image (R). In FIG. 1, reference numeral 1 denotes a backlight that irradiates light to the display panel 3, and 2 and 4 denote polarizers attached on upper and lower surfaces of the display panel 3 to select a linear polarization, respectively.

With such glass methods, visibility of the 3D image is degraded due to crosstalk generated at the position of an up/down viewing angle, thereby narrowing the up/down viewing angle. The crosstalk is generated because the left eye image (L) passes through the right eye patterned retarder region as well as the left eye patterned retarder region and the right eye image (R) passes through the left eye patterned retarder region as well as the right eye patterned retarder region at the up/down viewing angle position, as shown in the shaded portions of the polarization glasses 6 in FIG. 1. In the polarization glasses 6 in FIG. 1, the shaded portion shows the right image and the non-shaded portion shows the left image. Thus, a Japanese Laid Open Publication No. 2002-185983 discloses a method for obtaining a wider up/down viewing angle by forming black stripes (BS) at the patterned retarder regions corresponding to black matrixes (BM) of the display panel to improve the visibility of the 3D image, as shown in FIG. 2. In FIG. 2, when observed at a certain distance (D), a viewing angle (α), at which crosstalk is theoretically not generated, depends on the size of black matrixes (BM) of the display panel, the size of the black stripes (BS) of the patterned retarder, and the size of the spacer (S) between the display panel and the patterned retarder. The viewing angle (α) widens as the sizes of the black matrixes and the black stripes increases and as the spacer (S) between the display panel and the patterned retarder decreases. However, the related art has the following problems.

First, the black stripes of the patterned retarder aimed for improving the visibility of the 3D image through enhancement of the viewing angle interact with the black matrixes of the display panel, thereby generating moiré. Accordingly, when a 2D image is displayed, the visibility of the 2D image is degraded. FIG. 3 shows the results obtained by observing a display device sample with a size of 47 inches at a location 4 meters away from the display device with black stripes. When a 2D image is displayed, moirés of 90 mm, 150 mm, and 355 mm are generated for observation positions A, B, and C, respectively.

Second, the black stripes aimed for improving the visibility of the 3D image through enhancement of the viewing angle creates a side effect that the luminance of the 2D image is degraded. As shown in FIG. 4(*b*), this is because certain portions of pixels of the display panel are covered by the black stripe patterns. Accordingly, when the 2D image is displayed, the amount of transmitted light decreases by about 30% compared with the case where black strips are not formed, as shown in FIG. 4(*a*).

SUMMARY OF THE INVENTION

Accordingly, the present invention is directed to the image display device that substantially obviates one or more problems due to limitations and disadvantages of the related art.

An object of the present invention is to provide an image display device capable of improving visibility of both a two-dimensional (2D) image and a three-dimensional (3D) image and minimizing a reduction in luminance in displaying a 2D image.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an image display device includes an image display panel including a plurality of pixels configured to display a 2D image or a 3D image, a driving circuit configured to apply a data voltage in a 2D image format or a data voltage in a 3D image format to the image display panel, a controller configured to control the driving circuit in a 2D mode for displaying the 2D image or in a 3D mode for displaying the 3D image, and a patterned retarder configured to convert light from the image display panel to alternately have a first polarization and a second polarization, wherein each pixel includes first to fourth subpixels, and the data voltage in the 2D image format is applied to the first to third subpixels and a luminance compensation voltage is applied to the fourth subpixel in the 2D mode, while the data voltage in the 3D image format is applied to the first to third subpixels and a dark gray voltage is applied to the fourth subpixel in the 3D mode.

In another aspect, an image display device includes an image display panel configured to display a 2D image or a 3D image, a driving circuit configured to apply a data voltage in a 2D image format or a data voltage in a 3D image format, a controller configured to control the driving circuit in a 2D mode for displaying the 2D image or in a 3D mode for displaying the 3D image, and a patterned retarder configured to convert light from the image display panel to alternately have a first polarization and a second polarization, wherein R, G, and B subpixels of the image display panel each comprises first and second fine subpixels, and the data voltage in the 2D data format is applied to the first fine subpixel and a luminance compensation voltage is applied to the second fine subpixel in the 2D mode, and the data voltage in the 3D data format is applied to the first fine subpixel and a dark gray voltage is applied to the second fine subpixel in the 3D mode.

In another aspect, a liquid crystal display device includes an upper substrate, a lower substrate, and a liquid crystal layer therebetween, a backlight unit including a light source to provide the light to an image display panel including a plurality of pixels configured to display a 2D image or a 3D image, a lower polarizer disposed on the lower substrate, an upper polarizer disposed on the upper substrate, and a color filter array including a black matrix and a color filter a driving circuit configured to apply a data voltage in a 2D image format or a data voltage in a 3D image format to the image display panel, a controller configured to control the driving circuit in a 2D mode for displaying the 2D image or in a 3D mode for displaying the 3D image, and a patterned retarder disposed configured to convert light from the image display panel to alternately have a first polarization and a second polarization, wherein each pixel includes first to fourth subpixels, and the data voltage in the 2D image format is applied to the first to third subpixels and a luminance compensation voltage is applied to the fourth subpixel in the 2D mode, while the data voltage in the 3D image format is applied to the first to third subpixels and a dark gray voltage is applied to the fourth subpixel in the 3D mode.

In another aspect, a liquid crystal display device includes an upper substrate, a lower substrate, and a liquid crystal layer therebetween, a backlight unit including a light source to provide the light to an image display panel including a plurality of pixels configured to display a 2D image or a 3D image, a lower polarizer disposed on the lower substrate, an upper polarizer disposed on the upper substrate, a color filter array including a black matrix and a color filter, a driving circuit configured to apply a data voltage in a 2D image format or a data voltage in a 3D image format to the image display panel, a controller configured to control the driving circuit in a 2D mode for displaying the 2D image or in a 3D mode for displaying the 3D image, and a patterned retarder disposed configured to convert light from the image display panel to alternately have a first polarization and a second polarization, wherein R, G, and B subpixels of the image display panel each comprises first and second fine subpixels, and the data voltage in the 2D data format is applied to the first fine subpixel and a luminance compensation voltage is applied to the second fine subpixel in the 2D mode, and the data voltage in the 3D data format is applied to the first fine subpixel and a dark gray voltage is applied to the second fine subpixel in the 3D mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
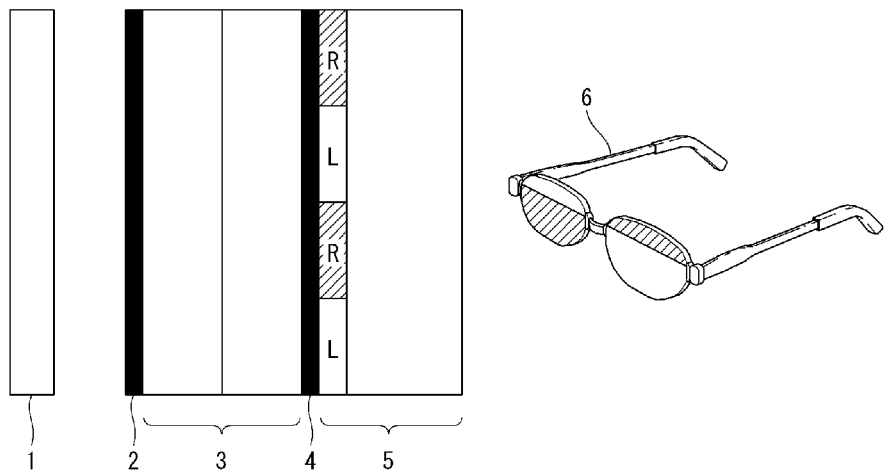
FIG. 1 is a schematic view illustrating a glass type image display device.
Figure 2:
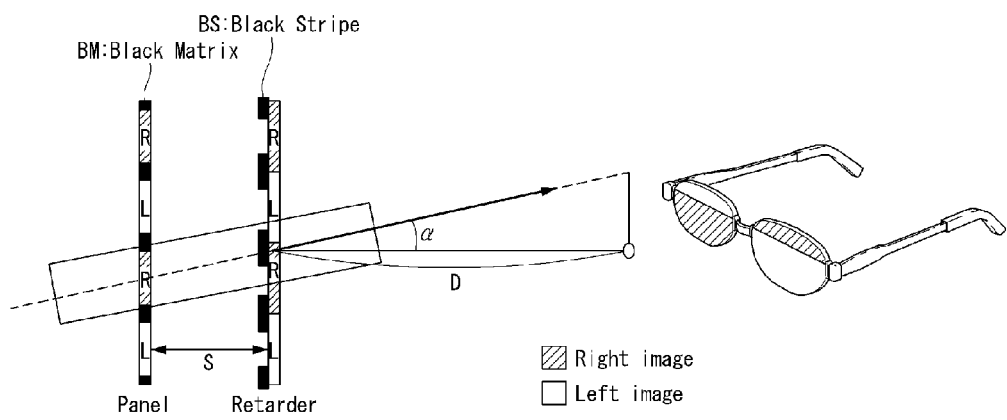
FIG. 2 illustrates formation of black stripes at a patterned retarder region corresponding to black matrixes of a display panel of the related art image display device.
Figure 3:
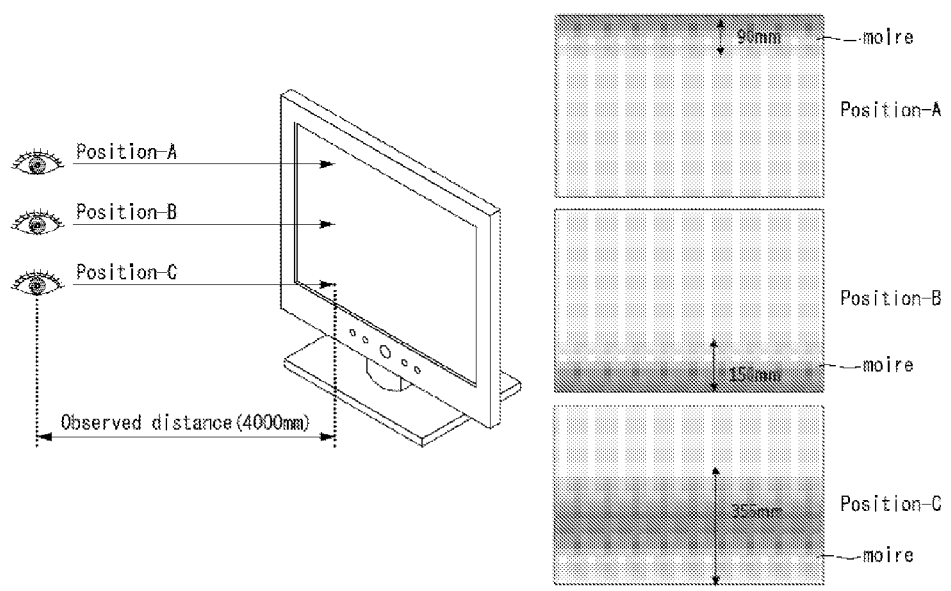
FIG. 3 illustrates moiré generated due to the black stripe patterns in the related art image display device.
Figure 4:
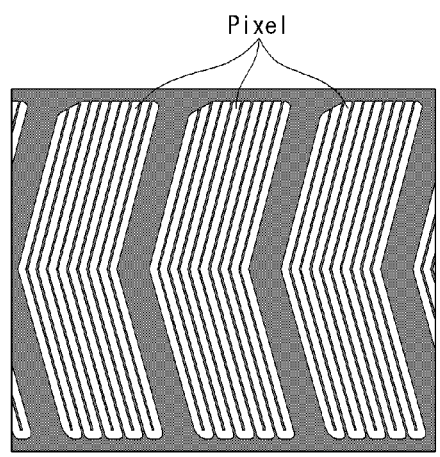
FIG. 4 illustrates a reduction in light transmission due to the black strip patterns in the related art image display device.
Figure 4:
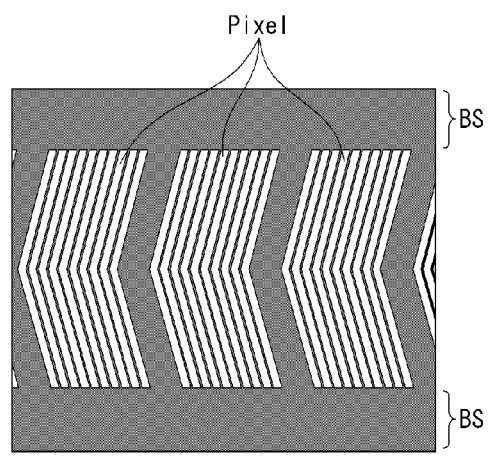
Figure 5:
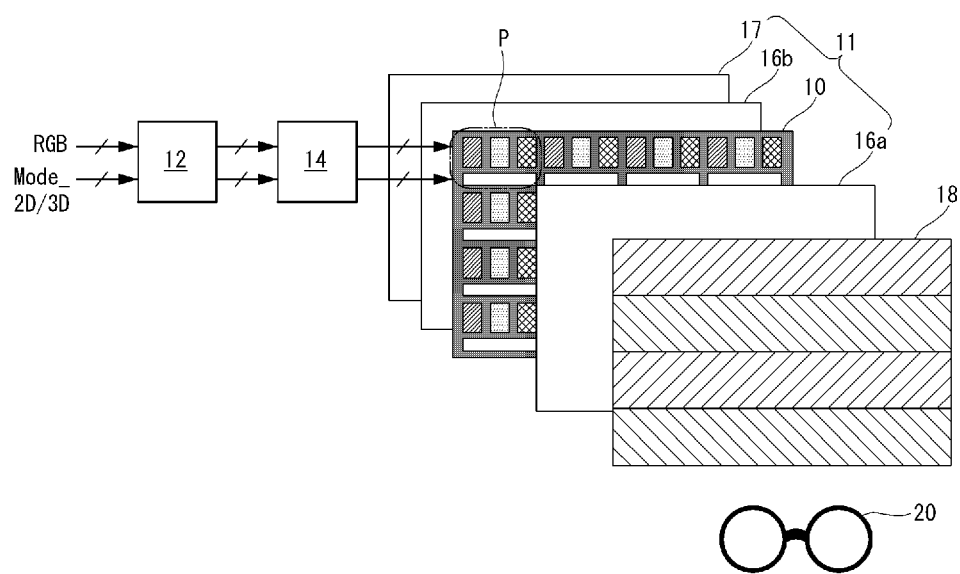
FIG. 5 is a schematic block diagram of an image display device according to a first exemplary embodiment of the present invention.

FIG. 5 is a schematic block diagram of an image display device according to a first exemplary embodiment of the present invention. As shown in FIG. 5, the image display device according to a first exemplary embodiment of the present invention includes a display element 11, a controller 12, a driving circuit 14, a patterned retarder 18, and polarization glasses 20. The display element 11 may be implemented as one of a flat panel display such as a liquid crystal display (LCD), a field emission display (FED), a plasma display panel (PDP), and an electroluminescence device (ELD)

including an inorganic ELD and an organic light emitting diode (OLED). When the display element 11 is implemented as an LCD, the image display device may further include a backlight unit 17 disposed at a lower portion of an image display panel 10, an upper polarizer 16a disposed between the image display panel 10 and the patterned retarder 18, and a lower polarizer 16b disposed between the image display panel 10 and the backlight unit 17. Hereinafter, a case where the display element 11 is implemented as an LCD will be taken as an example for simplicity. The patterned retarder 18, the polarization glasses 20, and the 3D driving elements implement binocular disparity by spatially separating a left eye image and a right eye image.

The image display panel 10 includes two glass substrates and a liquid crystal layer interposed therebetween. The lower glass substrate includes a thin film transistor (TFT) array. The TFT array includes a plurality of data lines to which R, G, and B data voltages are supplied, a plurality of gate lines (or scan lines), crossing the data lines, to which gate pulses (or scan pulses) are supplied, a plurality of TFTs formed at crossings of the data lines and the gate lines, a plurality of pixel electrodes for charging the data voltages in liquid crystal cells, and a storage capacitor connected to the pixel electrodes and sustaining the voltage of the liquid crystal cells. The upper glass substrate includes a color filter array. The color filter array includes black matrixes, color filters, and the like. In a vertical field driving method such as a twisted nematic (TN) mode and a vertical alignment (VA) mode, a common electrode which faces pixel electrodes to form an electric field is formed on the upper glass substrate. In a horizontal field (i.e., in-plane field) driving method such as an in-plane switching (IPS) mode or a fringe field switching (FFS) mode, a common electrode is formed along with pixel electrodes on the lower glass substrate. The upper polarizer 16a is attached to the upper glass substrate, and the lower polarizer 16b is attached to the lower glass substrate. An alignment film is formed to set a pre-tilt angle of liquid crystal at an inner surface in contact with the liquid crystal. A column spacer may be formed between the glass substrates to sustain a cell gap of liquid crystal cells.

Figure 6:
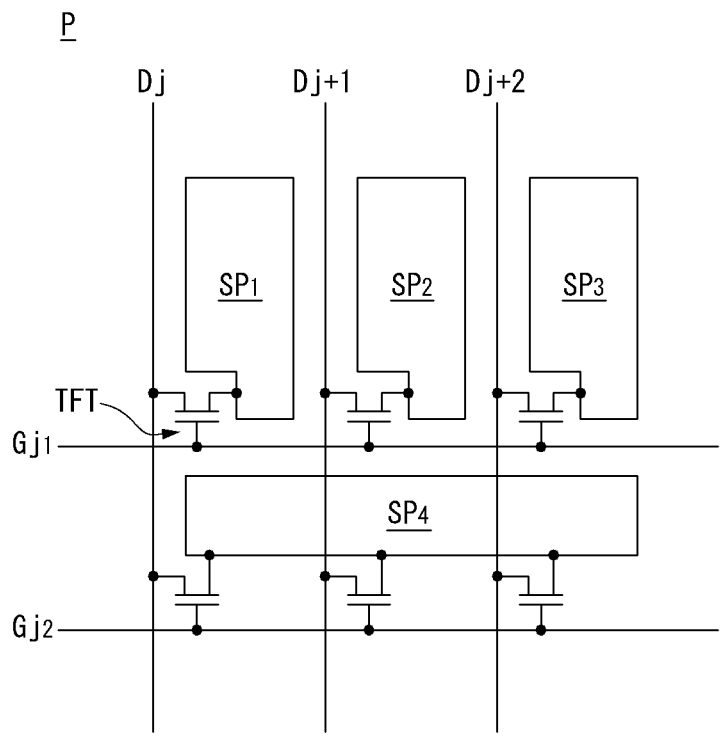
FIG. 6 is a detailed view illustrating a unit pixel structure of FIG. 5.

As shown in FIG. 6, a unit pixel (P) formed on the image display panel 10 includes a first subpixel SP1, a second subpixel SP2, a third subpixel SP3, and a fourth subpixel SP4 disposed under the first to third subpixels SP1 to SP3 to form a quad type structure together with the first to third subpixels SP1 to SP3. In order to improve visibility of 2D and 3D images and minimize degradation of luminance, three horizontally adjacent data lines Dj, Dj+1, and Dj+2 and two vertically adjacent gate lines Gj1 and Gj2 are allocated to the unit pixel (P). The first subpixel SP1 is connected to the first data line Dj and the first gate line Gj1 via a thin film transistor (TFT) formed at a crossing of the first data line Dj and the first gate line Gj1. The second subpixel SP2 is connected to the second data line Dj+1 and the first gate line Gj1 via a TFT formed at a crossing of the second data line Dj+1 and the first gate line Gj1. The third subpixel SP3 is connected to the third data line Dj+2 and the first gate line Gj1 via a TFT formed at a crossing of the third data line Dj+2 and the first gate line Gj1. The fourth subpixel SP4 is commonly connected to the second gate line Gj2 and the data lines Dj to Dj+2 via three TFTs formed at each crossing of the second gate line Gj2 and the first to third data lines Dj to Dj+2. Accordingly, the first sub-pixel SP1 charges a first data voltage supplied from the first data line Dj in response to a gate pulse from the first gate line Gj1, the second subpixel SP2 charges a second data voltage supplied from the second data line Dj+1 in response to the gate pulse from the first gate line Gj1, and the third subpixel SP3 charges a third data voltage supplied from the third data line Dj+2 in response to the gate pulse from the first gate line Gj1. The fourth subpixel SP4 charges a fourth data voltage commonly supplied from the first to third data lines Dj to Dj+2 in response to a gate pulse from the second gate line Gj2.

Figure 7A:
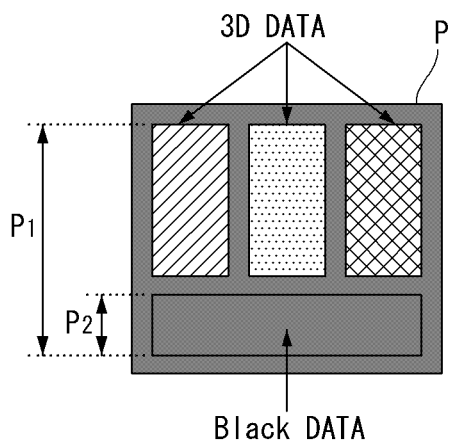
FIG. 7A illustrates a display state of pixels for displaying a 3D image according to the first exemplary embodiment of the present invention.

The image display panel 10 displays the 2D image in the 2D mode (Mode_2D) and the 3D image in the 3D mode (Mode_3D) under the control of controller 12. When the image display panel 10 is driven in the 3D mode (Mode_3D), the first data voltage charged to the first subpixel SP1, the second data voltage charged to the second subpixel SP2, and the third data voltage charged to the third subpixel SP3 are R, G, and B data voltages in a 3D data format, as shown in FIG. 7A, respectively. On the other hand, when the image display panel 10 is driven in the 3D mode (Mode_3D), the fourth data voltage charged to the fourth subpixel SP4 is a dark gray voltage. As shown in FIG. 7A, a dark gray voltage can be a black data voltage, black gray voltage, or any voltage that is capable of substantially performing a function of a black stripe. The dark gray voltage is displayed between the vertically adjacent 3D images to widen the display space between the 3D images. As a result, in the 3D mode (Mode_3D), the up/down viewing angle is broadly secured by the fourth subpixel SP4 to which the dark gray voltage is applied, improving visibility. Accordingly, there is no need to form black stripe patterns on the patterned retarder as in the related art.

Figure 7B:
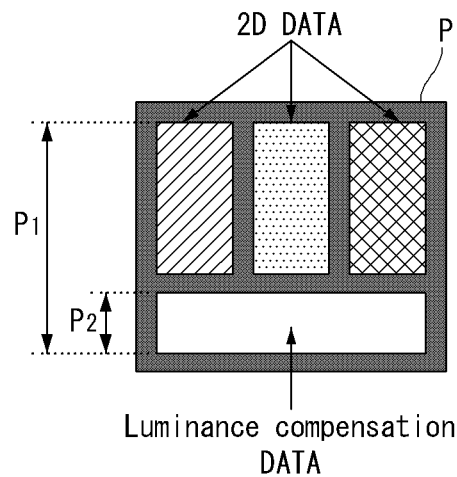
FIG. 7B illustrates a display state of pixels for displaying a 2D image according to the first exemplary embodiment of the present invention.

When the image display panel 10 is driven in the 2D mode (Mode_2D), the first data voltage charged to the first subpixel SP1, the second data voltage charged to the second subpixel SP2, and the third data voltage charged to the third subpixel SP3 are R, G, and B data voltages in a 2D data format, as shown in FIG. 7B. When the image display panel 10 is driven in the 2D mode (Mode_2D), the fourth data voltage charged to the fourth subpixel SP4 is a luminance compensation voltage as shown in FIG. 7B. The luminance compensation voltage has a luminance value close to an average luminance value of the R, G, and B data voltages in the 2D data format. The luminance compensation voltage serves to raise the overall luminance level of the quad type pixel (P). Thus, luminance degradation in the 2D mode (Mode_2D) is minimized by the fourth subpixel SP4 to which the luminance compensation voltage is applied.

Figure 8:
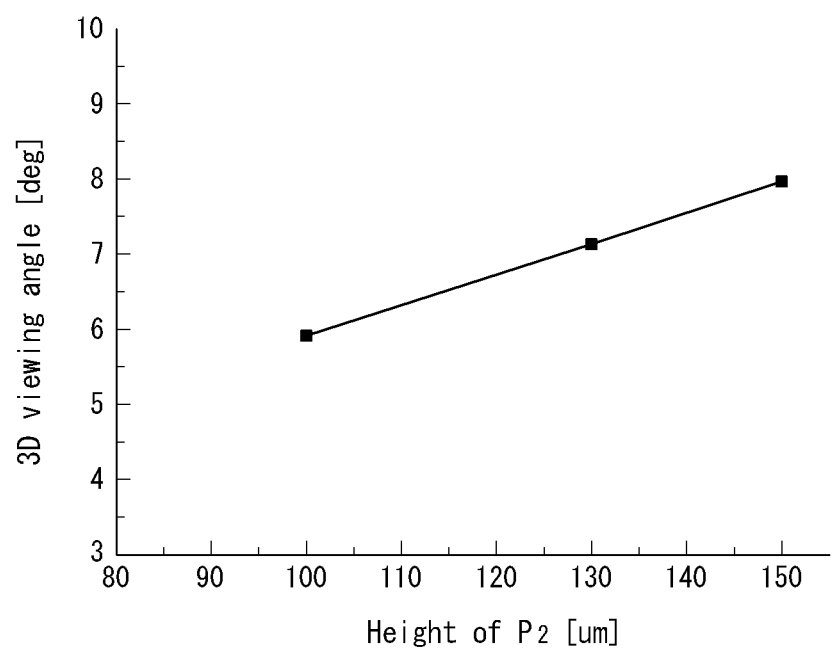
FIG. 8 is a graph of a 3D viewing angle changing over vertical pitches of a second fine subpixel.

As shown in FIG. 8, the ratio ((P2*100)/P1) of a vertical pitch (P2) of the fourth subpixel SP4 to a vertical pitch (P1) of the quad type pixel (P) has a close relationship with the 3D up/down viewing angle. Although not shown, the ratio ((P2*100)/P1) further has a close relationship with the luminance of the 3D image. In other words, as the ratio ((P2*100)/P1) of the vertical pitch P2 of the fourth subpixel SP4 to the vertical pitch P1 of the quad type pixel (P) increases, the 3D up/down viewing angle widens but the luminance of the 3D image is degraded correspondingly. Meanwhile, as the ratio ((P2*100)/P1) of the vertical pitch P2 of the fourth subpixel SP4 to the vertical pitch P1 of the quad type pixel (P) decreases, the luminance of the 3D image is increased but the 3D up/down viewing angle narrows correspondingly. Thus, the vertical pitch P2 of the fourth subpixel SP4 must be designed to have a proper size according to the relationship between the 3D up/down viewing angle and the luminance of the 3D image. For example, the ratio (P2*100)/P1 can be set to be approximately 33.

The driving circuit 14 includes a data driving circuit for supplying RGB data voltages, the dark gray voltages, and the luminance compensation voltage to the data lines of the image display panel 10. The driving circuit 14 further includes a gate driving circuit for sequentially supplying gate pulses to the gate lines of the image display panel 10. The data driving circuit converts the RGB digital video data in the 3D data format input from the controller 12 in the 3D mode (Mode_3D) into analog gamma voltages to generate RGB data voltages, and converts digital black data input from the controller 12 into analog gamma voltages of a peak black gray level to generate dark gray voltages. The data driving circuit alternately supplies the RGB data voltages and the dark gray voltages to the data lines of the image display panel 10 in the cycles of one horizontal period under the control of the controller 12. Meanwhile, the data driving circuit converts the RGB digital video data in the 2D data format input from the controller 12 in the 2D mode (Mode_2D) into analog gamma voltages to generate RGB data voltages, and converts digital luminance compensation data input from the controller 12 into analog gamma voltages corresponding to an average gray level of the RGB digital video data to generate luminance compensation voltages. The data driving circuit supplies the RGB data voltages and the luminance compensation voltages to the data lines of the image display panel 10 under the control of the controller 12. Because two gate lines are allocated per unit pixel (P) having the quad type structure, the gate driving circuit sequentially drives the gate lines twice for each pixel.

The controller 12 controls the driving circuit 14 in the 2D mode (Mode_2D) or the 3D mode (Mode_3D) in response to a 2D/3D mode select signal from the user input through a user interface, or a 2D/3D identification code extracted from an input image signal. In the 3D mode (Mode_3D), the controller 12 alternately mixes internally generated digital black data (e.g., reading a value set as a register initial value of the controller 12 itself) with the RGB digital video data, input in a 3D data format from the exterior, one horizontal line by one horizontal line to rearrange the RGB digital video data and the digital black data in a quad type pixel structure. The controller 12 further supplies the rearranged data to the data driving circuit. Meanwhile, in the 2D mode (Mode_2D), the controller 12 alternately mixes the RGB digital video data, input in a 2D data format from the exterior, with internally determined digital luminance compensation data, one horizontal line by one horizontal line to rearrange the RGB digital video data and the digital luminance compensation data in a quad type pixel structure. The controller 12 further supplies the rearranged data to the data driving circuit. Here, the digital luminance compensation data may be determined pixel by pixel based on the average luminance value of the RGB digital video data applied to the particular quad type pixel (P). In this case, the controller 12 may include a luminance calculation unit for calculating an average luminance value for each pixel (P) of the RGB digital data in the 2D data format and a memory for outputting the digital luminance compensation data. The digital luminance compensation data determined through experimentation can be stored in the memory. The digital luminance compensation data may be determined to have a luminance value approximate to the average luminance value within a threshold range in which the visibility of the RGB digital data is not impaired. In other words, the digital luminance compensation data may be determined such that the difference between the luminance value of the digital luminance compensation data and the average luminance value come within the threshold value range in which the visibility is not impaired.

The controller 12 generates timing control signals for controlling an operation timing of the driving circuit 14 by using timing signals such as a vertical synchronization signal, a horizontal synchronization signal, a dot clock, a data enable signal, and the like. The controller 12 may drive the driving circuit 14 at a frame frequency of N×60 Hz, e.g., 120 Hz, a frame frequency which is twice the input frame frequency, by increasing the timing control signals by an integral multiple. In the 3D mode (Mode_3D), the controller 12 may control the driving circuit 14 to apply the RGB data voltages at a frame frequency of 120 Hz to the first to third subpixels SP1, SP2, and SP3 and the dark gray voltage at a frame frequency of 120 Hz to the fourth subpixel SP4. Also, in the 2D mode (Mode_2D), the controller 12 may control the driving circuit 14 to apply the RGB data voltages at a frame frequency of 120 Hz to the first to the third subpixels SP1, SP2, and SP3 and the luminance compensation voltage at a frame frequency of 120 Hz to the fourth subpixel SP4.

The backlight unit 17 includes one or more light sources and a plurality of optical members that convert light from the light sources into surface beams and irradiate the same to the image display panel 10. The light source may include at least one of HCFL (Hot Cathode Fluorescent Lamp), CCFL (Cold Cathode Fluorescent Lamp), EEFL (External Electrode Fluorescent Lamp), FFL (Flange Focal Length), and LED (Light Emitting Diode). The optical members, including a light guide plate, a diffusion plate, a prism sheet, a diffusion sheet, and the like, increase surface uniformity of light from the light sources.

The patterned retarder 18 may be patterned on one of the glass substrate, the transparent plastic substrate, and a film. The substrate or the like with the patterned retarder 18 formed thereon is attached to the upper polarizer 16a by an adhesive. The patterned retarder 18, including first and second retarders whose light absorption axes are perpendicular to each other, divides the 3D image into polarization components. The first retarder is formed at odd numbered lines of the patterned retarder 18 and allows a first polarization (linear polarization or circular polarization) component of light incident through the upper polarizer 16a to transmit therethrough. The second retarder is formed at even numbered lines and allows a second polarization (linear polarization or circular polarization) component of light incident through the upper polarizer 16a to transmit therethrough. For example, the first retarder may be implemented as a polarization filter allowing transmission of light with a left circular polarization, and the second retarder may be implemented as a polarization filter allowing transmission of light with a right circular polarization.

The polarization glasses 20 are implemented such that its light absorption axis differs depending on the polarization components output from the patterned retarder 18. For example, the left eye of the polarization glasses 20 allows the left circular polarization incident from the first retarder of the patterned retarder 18, blocking light of other polarization components, and the right eye of the polarization glasses 20 allows transmission of the right circular polarization incident from the second retarder of the patterned retarder 18, blocking light of other polarization components. In this example, the left eye of the polarization glasses 20 includes a left circular polarization filter and the right eye of the polarization glasses 20 includes a right circular polarization filter.

Figure 9:
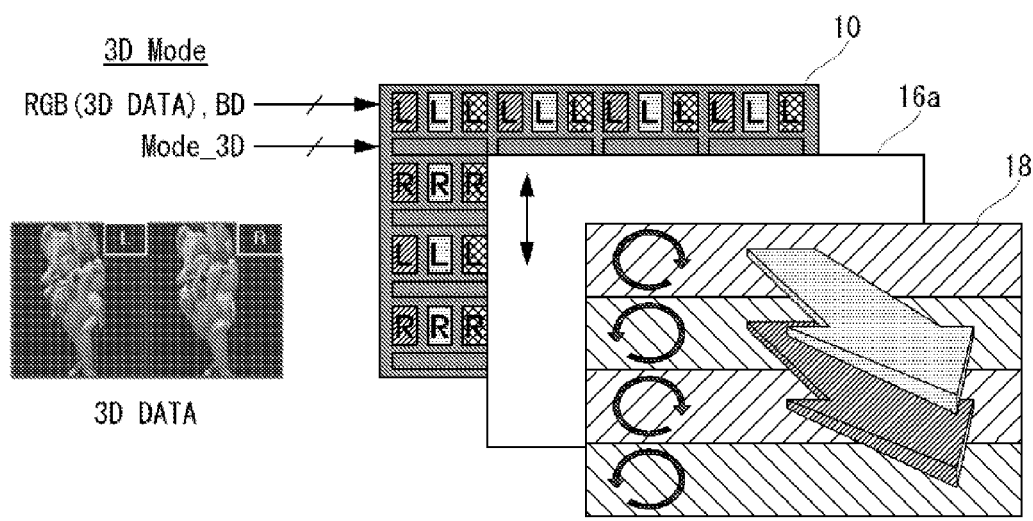
FIG. 9 is an exemplary schematic view illustrating the operation of the image display device in a 3D mode.
Figure 9:
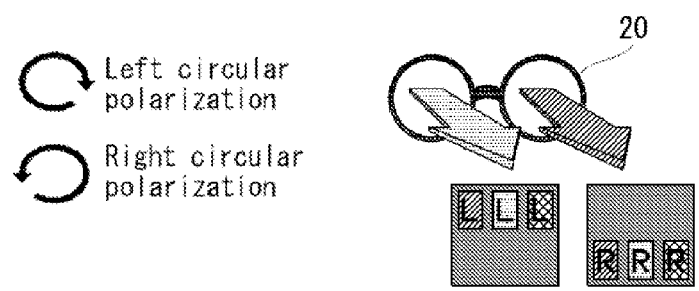

FIG. 9 is a schematic view illustrating the operation of the image display device in the 3D mode. As shown in FIG. 9, in the 3D mode (Mode_3D), the left eye RGB data voltages and right eye RGB data voltages in the 3D data format are alternately applied in units of horizontal lines to the odd numbered horizontal lines of the image display panel 10. As a result, left eye RGB images (L) are sequentially displayed on the first to third subpixels disposed at the (2i−1)th horizontal lines, where i is a positive odd number, and right eye RGB images (R) are sequentially displayed on the first to third subpixels disposed at the (2i+1)th horizontal lines, where i is a positive odd number. Such left eye RGB images (L) and the right eye RGB images (R) are divided into polarization components by the first and second retarders formed by lines at the patterned retarder 18. The left eye RGB images (L) which have been transmitted through the first retarder are transmitted to the left eye of the polarization glasses 20, and the right eye RGB images (R) which have been transmitted through the second retarder are transmitted to the right eye of the polarization glasses 20, thus displaying the 3D image.

In the 3D mode (Mode_3D), the dark gray voltages BD are applied to the fourth subpixels disposed at the even numbered horizontal lines of the image display panel 10. The fourth sub-pixels displaying a black image upon receiving the dark gray voltages BD increase the display interval of the left eye RGB images (L) and the right eye RGB images (R) which are vertically adjacent to each other. Thus, in the 3D mode (Mode_3D), the up/down viewing angle can be increased, thereby improving 3D visibility.

Figure 10:
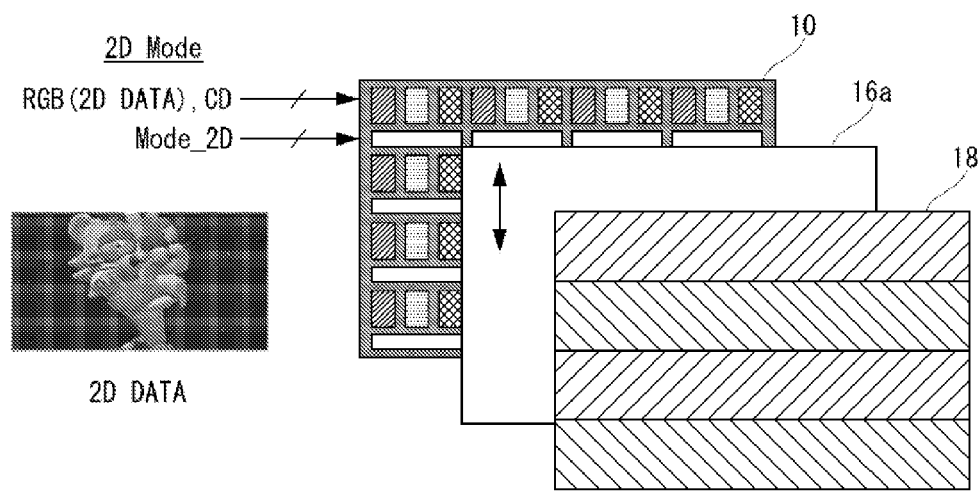
FIG. 10 is an exemplary schematic view illustrating the operation of the image display device in a 2D mode.

FIG. 10 is a schematic view illustrating the operation of the image display device in the 2D mode. As shown in FIG. 10, in the 2D mode (Mode_2D), RGB data voltages in the 2D data format are applied to the first to third subpixels disposed at the odd numbered horizontal lines of the image display panel 10, and the luminance compensation voltage (CD) is applied to the fourth subpixels disposed at the even numbered horizontal lines of the image display panel 10. Because the RGB image by the RGB data voltages has a 2D data format, it is transmitted through the patterned retarder 18 as is.

In the 2D mode (Mode_2D), degradation of luminance is minimized by the fourth subpixels to which the luminance compensation voltage (CD) is applied. In addition, because the patterned retarder 18 does not have black stripe patterns, moiré is not generated and thus, degradation of visibility of the 2D image can be prevented.

Figure 11:
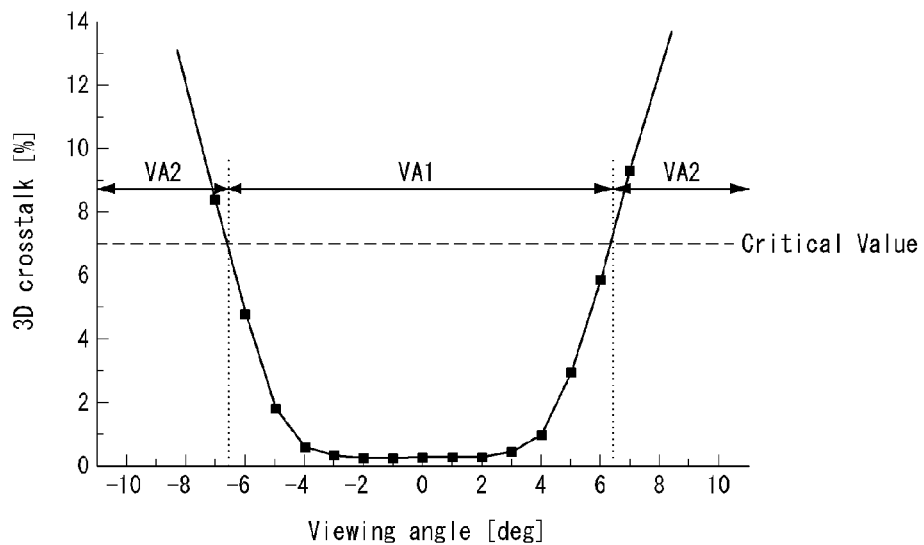
FIG. 11 is a graph showing the crosstalk value of a 3D image as a function of the 3D viewing angle.

FIG. 11 is a graph showing the 3D crosstalk as a function of the 3D viewing angle. In FIG. 11, a horizontal axis indicates up (+)/down (−) viewing angle [deg] of the 3D image, and a vertical axis indicates a 3D crosstalk value [%].

In the image display device that displays the 3D image by alternately displaying the left eye image and the right eye image in units of the horizontal lines, which passes through patterned retarders positioned at a certain distance from the image display panel, thereby changing polarization characteristics in units of the horizontal lines, as mentioned above, the left eye image must pass through only the left eye retarder and the right eye image must pass through only the right eye retarder to display a 3D image with good picture quality. However, a 3D crosstalk (C/T), wherein portion of the left eye image passes through the right eye retarder as well as the left eye retarder and portion of the right eye image passes through the left eye retarder as well as the right eye retarder, may be generated when the image is viewed at an angle in the vertical direction. The generated 3D crosstalk (C/T) may be represented by Equation 1 shown below:

$$C/T[\%] = \frac{L_{Black}R_{White} - \text{Black}}{L_{White}R_{Black} - \text{Black}} \times 100 \quad \text{[Equation 1]}$$

Here, '$L_{Black}R_{White}$' is a luminance value of the pattern displaying black at the left eye pixels and white at the right eye pixels, '$L_{White}R_{Black}$' is a luminance value of the pattern displaying white at the left eye pixels and black at the right eye pixels. 'Black' is a luminance value measured after black is displayed on the entire pixels. In general, when the value of the 3D crosstalk (C/T) calculated through Equation 1 is 7% or less for a viewing angle, the viewing angle is defined to be the 3D viewing angle at which a 3D image of good picture quality can be obtained. Thus, the 7% 3D crosstalk (C/T) value is a critical value for determining a 3D viewing angle in obtaining good 3D image. However, this critical value (7%) may vary depending on models of image display devices.

As noted in the graph of FIG. 11, the user can view a 3D image of good picture quality within the viewing angle range (VA1) in which the 3D crosstalk value [%] is smaller than the predetermined critical value (e.g., 7%), while he cannot view such a 3D image of good picture quality within the viewing angle range (VA2) in which the 3D crosstalk value [%] exceeds the predetermined critical value (7%) because the left eye and right eye images overlap.

Figure 12:
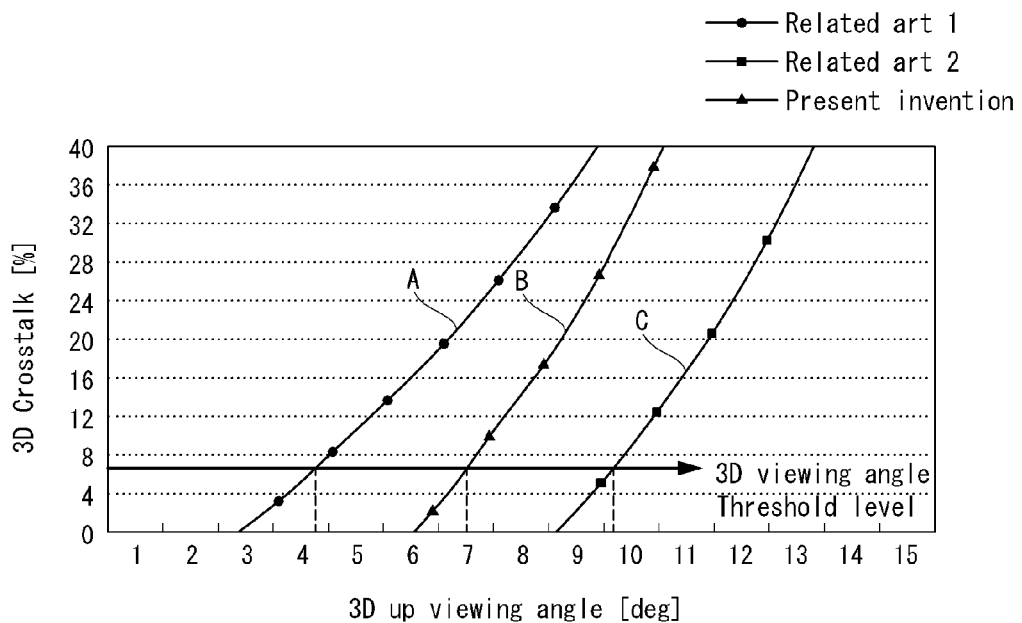
FIG. 12 is a graph showing a comparison between the up viewing angle of the 3D image according to the first exemplary embodiment of the present invention and the related arts.

FIG. 12 is a graph showing the comparison between the up viewing angle of the 3D image according to an exemplary embodiment of the present invention and the related arts. In FIG. 12, the horizontal axis indicates the up viewing angle (deg) of the 3D image, and the vertical axis indicates the crosstalk value (%) of the 3D image.

In the graph of FIG. 12, a line 'A' indicates an up viewing angle of a first related art in which left and right eye images have a display interval of 80 μm by black matrixes and a patterned retarder does not have black stripes. It is noted that the up viewing angle range satisfying the critical value (e.g., 7%) of the 3D crosstalk is 0° to 4°, which is very narrow. A line 'C' indicates an up viewing angle of a second related art in which left and right eye images have a display interval of 80 μm by black matrixes and a patterned retarder have black stripe patterns with a width of 210 μm. It is noted that the up viewing angle range satisfying the critical value (e.g., 7%) of the 3D crosstalk is 0° to 10°, which is relatively wide. However, as afore-mentioned, the first and second related arts have the side effects wherein the visibility and luminance of the 2D image are degraded due to the presence of the black stripe patterns for securing the viewing angle.

In contrast, in the first exemplary embodiment of the present invention, the subpixels are each configured as the quad type pixels. In displaying a 2D image, the luminance compensation voltage is applied to the fourth subpixels, and in displaying a 3D image, the dark gray voltage is applied to the fourth subpixels. Accordingly, when the 3D image is displayed, the display interval of the left eye image and the right eye image can be secured by 200 μm even without black strip patterns. Thus, the up viewing angle range satisfying the critical value (e.g., 7%) of the 3D crosstalk can increased to about 7° as shown by a line 'B' in the graph of FIG. 12, without degrading the visibility and luminance of the 2D image.

Figure 13:
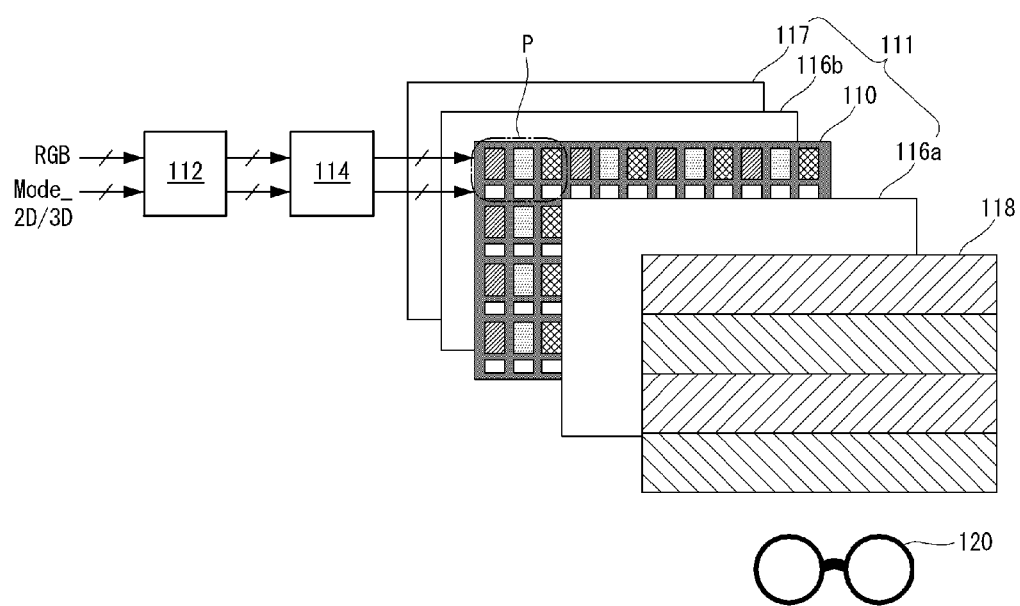
FIG. 13 is a schematic block diagram of an image display device according to a second exemplary embodiment of the present invention.

As shown in FIG. 13, the image display device according to a second exemplary embodiment of the present invention includes a display element 111, a controller 112, a driving circuit 114, a patterned retarder 118, and polarization glasses 120. The display element 111 may be implemented as one of a flat panel display such as a liquid crystal display (LCD), a field emission display (FED), a plasma display panel (PDP), and an electroluminescence device (ELD) including an inorganic ELD and an organic light emitting diode (OLED). When the display element 111 is implemented as an LCD, the image display device may further include a backlight unit 117 disposed at a lower portion of an image display panel 110, an upper polarizer 116a disposed between the image display panel 110 and the patterned retarder 118, and a lower polarizer 116b disposed between the image display panel 110 and the backlight unit 117. Hereinafter, a case where the display element 111 is implemented as an LCD will be taken as an example for simplicity. The patterned retarder 118, the polarization glasses 120, and the 3D driving elements implement binocular disparity by spatially separating a left eye image and a right eye image.

The image display panel 110 includes two glass substrates and a liquid crystal layer interposed therebetween. The lower glass substrate includes a thin film transistor (TFT) array. The TFT array includes a plurality of data lines to which R, G, and B data voltages are supplied, a plurality of gate lines (or scan lines), crossing the data lines, to which gate pulses (or scan pulses) are supplied, a plurality of TFTs formed at crossings of the data lines and the gate lines, a plurality of pixel electrodes for charging the data voltages in liquid crystal cells, and a storage capacitor connected to the pixel electrodes and sustaining the voltage of the liquid crystal cells. The upper glass substrate includes a color filter array. The color filter array includes black matrixes, color filters, and the like. In a vertical field driving method such as a twisted nematic (TN) mode and a vertical alignment (VA) mode, a common electrode which faces pixel electrodes to form an electric field is formed on the upper glass substrate. In a horizontal field (i.e., in-plane field) driving method such as an in-plane switching (IPS) mode or a fringe field switching (FFS) mode, a common electrode is formed along with pixel electrodes on the lower glass substrate. The upper polarizer 116a is attached to the upper glass substrate, and the lower polarizer 116b is attached to the lower glass substrate. An alignment film is formed to set a pre-tilt angle of liquid crystal at an inner surface in contact with the liquid crystal. A column spacer may be formed between the glass substrates to sustain a cell gap of liquid crystal cells.

Figure 14:
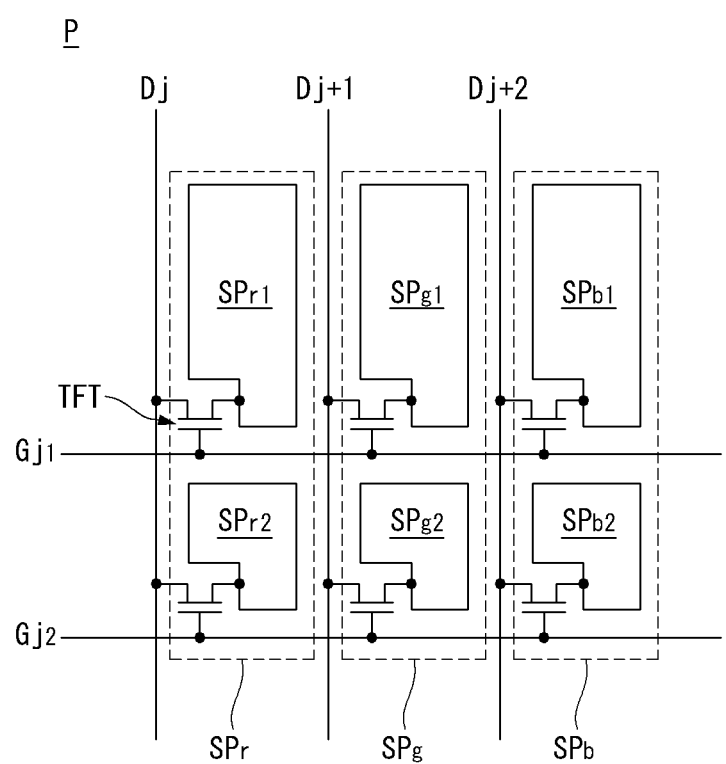
FIG. 14 is a detailed view of a unit pixel structure of FIG. 13.

As shown in FIG. 14, a unit pixel (P) formed on the image display panel 10 includes an R subpixel (SPr), a G subpixel (SPg), and a B subpixel (SPb). In order to improve visibility of 2D and 3D images and in order to minimize degradation of luminance of the 2D image, each of the subpixels (SPr/SPg/SPb) is divided into two fine subpixels along a vertical direction, namely, into first fine subpixels (SPr1/SPg1/SPb1) and second fine subpixels (SPr2/SPg2/SPb2) in performing driving. To this end, one data line and two gate lines are allocated to each of the subpixels (SPr/SPg/SPb) by using a connection via the TFTs. The R subpixel SPr is divided into a first fine subpixel SPr1 charging a (1-1)th data voltage supplied from a first data line Dj in response to a gate pulse from a first gate line Gj1 and a second fine subpixel SPr2 charging a (1-2)th data voltage supplied from the first data line in response to a gate pulse from a second gate line Gj2. The G subpixel SPg is divided into a first fine subpixel SPg1 charging a (2-1)th data voltage supplied from a second data line (Dj+1) in response to the gate pulse from the first gate line Gj1 and a second fine subpixel SPg2 charging a (2-2)th data voltage supplied from the second data line Dj+1 in response to the gate pulse from the second gate line Gj2 in performing driving. The B subpixel SPb is divided into a first fine subpixel SPb1 charging a (3-1)th data voltage supplied from a third data line Dj+2 in response to the gate pulse from the first gate line Gj1 and a second fine subpixel SPb2 charging a (3-2)th data voltage supplied from the third data line Dj+1 in response to the gate pulse from the second gate line Gj2.

Figure 15A:
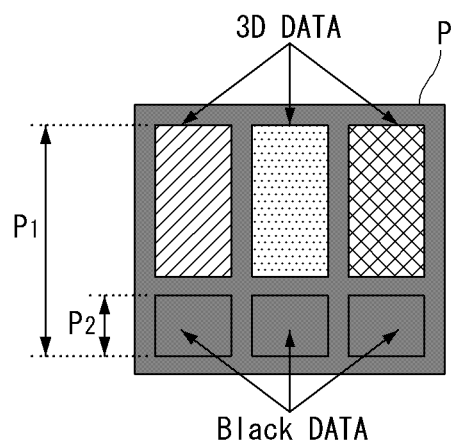
FIG. 15A illustrates a display state of pixels for displaying a 3D image according to the first exemplary embodiment of the present invention.

The image display panel 110 displays the 2D image in the 2D mode (Mode_2D) and the 3D image in the 3D mode (Mode_3D) under the control of controller 112. When the image display panel 110 is driven in the 3D mode (Mode_3D), the (1-1)th data voltage charged to the first fine subpixel SPr1, the (2-1)th data voltage charged to the first fine subpixel SPg1, and the (3-1)th data voltage charged to the first fine subpixel SPb1 are R, G, and B data voltages in a 3D data format, respectively, as shown in FIG. 15A. When the image display panel 110 is driven in the 3D mode (Mode_3D), the (1-2)th data voltage charged to the second fine subpixel SPr2, the (2-2)th data voltage charged to the second fine subpixel SPg2, and the (3-2)th data voltage charged to the second fine subpixel SPb2 are dark gray voltages, as shown in FIG. 15A. The dark gray voltages are displayed between vertically adjacent 3D images to serve to increase a display interval between the 3D images. As a result, an up/down viewing angle is secured to be wide in the 3D mode (Mode_3D) by the second fine subpixels SPr2, SPg2, and SPb2 to which the dark gray voltages are applied, improving the visibility. Thus, the present invention does not need to have black stripe patterns on the patterned retarder as in the related art.

Figure 15B:
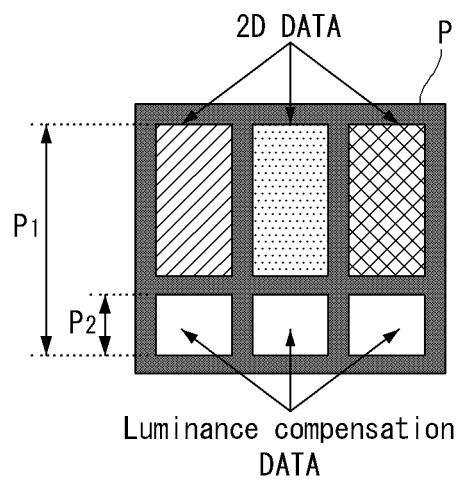
FIG. 15B illustrates a display state of pixels for displaying a 2D image according to the first exemplary embodiment of the present invention.

When the image display panel 110 is driven in the 2D mode (Mode_2D), the (1-1)th data voltage charged to the first fine subpixel SPr1, the (2-1)th data voltage charged to the first fine subpixel SPg1, and the (3-1)th data voltage charged to the first fine subpixel SPb1 are R, G, and B data voltages in the 2D data format, respectively, as shown in FIG. 15B. Meanwhile, when the image display panel 110 is driven in the 2D mode (Mode_2D), the (1-2)th data voltage charged to the second fine subpixel SPr2, the (2-2)th data voltage charged to the second fine subpixel SPg2, and the (3-2)th data voltage charged to the second fine subpixel SPb2 are luminance compensation voltages as shown in FIG. 15B. The luminance compensation voltages serve to raise the overall luminance level of the quad type pixel (P) with its luminance value having a level approximate to the average luminance value of the R, G, and B data voltages in the 2D data format. As a result, luminance degradation in the 2D mode (Mode_2D) can be minimized by the second fine subpixels SPr2, SPg2, and SPb2 to which the luminance compensation voltages are applied.

A vertical pitch P2 of the second fine subpixels (SPr2/SPg2/SPb2) as shown in FIGS. 15A and 15B has a close relationship with the 3D up/down viewing angle and the luminance of the 3D image. In other words, as shown in FIG. 8, the 3D up/down viewing angle widens as the ratio ((P2*100)/P1) of the vertical pitch P2 of the second fine subpixels (SPr2/SPg2/SPb2) to a vertical pitch P1 of the subpixels (SPr/SPg/SPb) increases, and narrows as the ratio ((P2*100)/P1) decreases. Meanwhile, the luminance of the 3D image decreases as the ratio ((P2*100)/P1) increases, and increases as the ratio ((P2*100)/P1) decreases. Thus, the vertical pitch P2 of the second fine subpixels (SPr2/SPg2/SPb2) must be designed to have a suitable size according to the relationship between the 3D up/down viewing angle and the luminance of the 3D image.

The driving circuit 114 includes a data driving circuit for supplying RGB data voltages and dark gray voltages to the data lines of the image display panel 110. The driving circuit 114 further includes a gate driving circuit for sequentially supplying gate pulses to the gate lines of the image display panel 110. The data driving circuit converts the RGB digital video data in the 3D data format input from the controller 112 in the 3D mode (Mode_3D) into analog gamma voltages to generate RGB data voltages, and converts digital black data input from the controller 112 into analog gamma voltages of a peak black gray level to generate dark gray voltages. The data driving circuit alternately supplies the RGB data voltages and the dark gray voltages to the data lines of the image display panel 110 in the cycles of one horizontal period under the control of the controller 112. Meanwhile, the data driving circuit converts the RGB digital video data in the 2D data format input from the controller 112 in the 2D mode (Mode_2D) into analog gamma voltages to generate RGB data voltages, and converts the digital luminance compensation data input from the controller 112 into analog gamma voltages corresponding to the average gray level of the RGB digital video data to generate luminance compensation voltages. The data driving circuit supplies the RGB data voltages and the luminance compensation voltages to the data lines of the image display panel 110 under the control of the controller 112. Because two gate lines are allocated per unit pixel (P), the gate driving circuit sequentially drives the gate lines twice for each pixel.

The controller 112 controls the driving circuit 114 in the 2D mode (Mode_2D) or the 3D mode (Mode_3D) in response to a 2D/3D mode select signal from the user input through a user interface, or a 2D/3D identification code extracted from an input image signal. In the 3D mode (Mode_3D), the controller 112 alternately mixes the RGB digital video data input in the 3D data format from the exterior with internally generated digital black data (e.g., reading a value set as a register initial value of the controller 112 itself), one horizontal line by one horizontal line, respectively, to rearrange the RGB digital video data and the digital black data. The controller 112 further supplies the rearranged data to the data driving circuit. Meanwhile, in the 2D mode (Mode_2D), the controller 112 alternately mixes the RGB digital video data input in the 2D data format from the exterior with internally determined digital luminance compensation data, one horizontal line by one horizontal line to rearrange the RGB digital video data and the digital luminance compensation data. The controller 112 further supplies the rearranged data to the data driving circuit. Here, the digital luminance compensation data may be determined pixel by pixel based on the average luminance value of the RGB digital video data applied to the particular quad type pixel (P). In this case, the controller 112 may include a luminance calculation unit for calculating an average luminance value for each pixel (P) of the RGB digital data in the 2D data format and a memory for outputting the digital luminance compensation data. The digital luminance compensation data determined through experimentation can be previously stored in the memory. The luminance compensation data may be determined to have a luminance value approximate to the average luminance value within a threshold range in which the visibility of the RGB digital data is not impaired. In other words, the digital luminance compensation data may be determined such that the difference between the luminance value of the digital luminance compensation data and the average luminance value come within the threshold value range in which the visibility is not impaired.

The controller 112 generates timing control signals for controlling an operation timing of the driving circuit 114 by using timing signals such as a vertical synchronization signal, a horizontal synchronization signal, a dot clock, a data enable signal, and the like. The controller 112 may drive the driving circuit 114 at a frame frequency of N×60 Hz, e.g., 120 Hz, a frame frequency which is twice the input frame frequency, by increasing the timing control signals by an integral multiple. In the 3D mode (Mode_3D), the controller 112 may control the driving circuit 114 to apply the RGB data voltages at a frame frequency of 120 Hz to the first fine subpixels (SPr1, SPg1, SPb1) and the dark gray voltages at a frame frequency of 120 Hz to the second fine subpixels (SPr2, SPg2, SPb2). Also, in the 2D mode (Mode_2D), the controller 112 may control the driving circuit 114 to apply the RGB data voltages at a frame frequency of 120 Hz to the first fine subpixels (SPr1, SPg1, SPb1) and the luminance compensation voltages at a frame frequency of 120 Hz to the second fine subpixels (SPr2, SPg2, SPb2).

The backlight unit 117 includes one or more light sources and a plurality of optical members that convert light from the light sources into surface beams and irradiate the same to the image display panel 110. The light source may include at least one of HCFL (Hot Cathode Fluorescent Lamp), CCFL (Cold Cathode Fluorescent Lamp), EEFL (External Electrode Fluorescent Lamp), FFL (Flange Focal Length), and LED (Light Emitting Diode). The optical members, including a light guide plate, a diffusion plate, a prism sheet, a diffusion sheet, and the like, increase surface uniformity of light from the light sources.

The patterned retarder 118 may be patterned on one of the glass substrate, the transparent plastic substrate, and a film. The substrate or the like with the patterned retarder 118 formed thereon is attached to the upper polarizer 116a by an adhesive. The patterned retarder 118, including first and second retarders whose light absorption axes are perpendicular to each other, divides the 3D image into polarization components. The first retarder is formed at odd numbered lines of the patterned retarder 118 and allows a first polarization (circular polarization and linear polarization) component of light incident through the upper polarizer 116a to transmit therethrough. The second retarder is formed at even numbered lines and allows a second polarization (circular polarization or linear polarization) component of light incident through the upper polarizer 116a to transmit therethrough. For example, the first retarder may be implemented as a polarization filter allowing transmission of light with a left circular polarization, and the second retarder may be implemented as a polarization filter allowing transmission of light with a right circular polarization.

The polarization glasses 120 are implemented such that its light absorption axis differs depending on the polarization components output from the patterned retarder 118. For example, the left eye of the polarization glasses 120 allows the left circular polarization incident from the first retarder of the patterned retarder 118, blocking light of other polarization components, and the right eye of the polarization glasses 120 allows transmission of the right circular polarization incident from the second retarder of the patterned retarder 118, blocking light of other polarization components. In this example, the left eye of the polarization glasses 120 includes a left circular polarization filter and the right eye of the polarization glasses 120 includes a right circular polarization filter.

Figure 16:
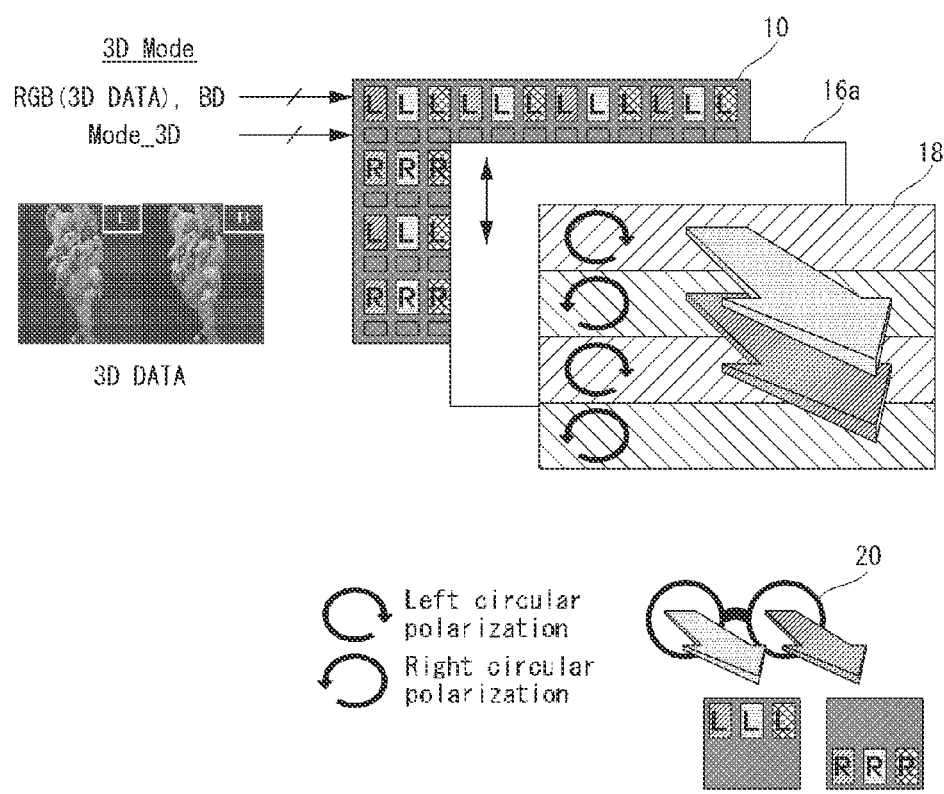
FIG. 16 is an exemplary schematic view illustrating the operation of the image display device in a 3D mode.

FIG. 16 is a schematic view illustrating the operation of the image display device in the 3D mode. As shown in FIG. 16, in the 3D mode (Mode_3D), the left eye RGB data voltages and right eye RGB data voltages in the 3D data format are alternately applied in units of two horizontal lines to the first fine subpixels disposed at the odd numbered horizontal lines of the image display panel 110. As a result, left eye RGB images (L) are sequentially displayed on the first fine subpixels disposed at the (2i−1)th horizontal lines, where i is a positive odd number, and right eye RGB images (R) are sequentially displayed at the first fine subpixels disposed at the (2i+1)th horizontal lines, where i is a positive odd number. Such left eye RGB images (L) and the right eye RGB images (R) are divided into polarization components by the first and second retarders formed by lines at the patterned retarder 118. The left eye RGB images (L) which have been transmitted through the first retarder are transmitted to the left eye of the polarization glasses 120, and the right eye RGB images (R) which have been transmitted through the second retarder are transmitted to the right eye of the polarization glasses 120, thus displaying the 3D image.

In the 3D mode (Mode_3D), the dark gray voltages BD are applied to the second fine subpixels disposed at the even numbered horizontal lines of the image display panel 110. The second fine sub-pixels displaying a black image upon receiving the dark gray voltages BD increase the display interval of the left eye RGB images (L) and the right eye RGB images (R) which are vertically adjacent to each other. Thus, in the 3D mode (Mode_3D), the up/down viewing angle can be increased, thereby improving 3D visibility.

Figure 17:
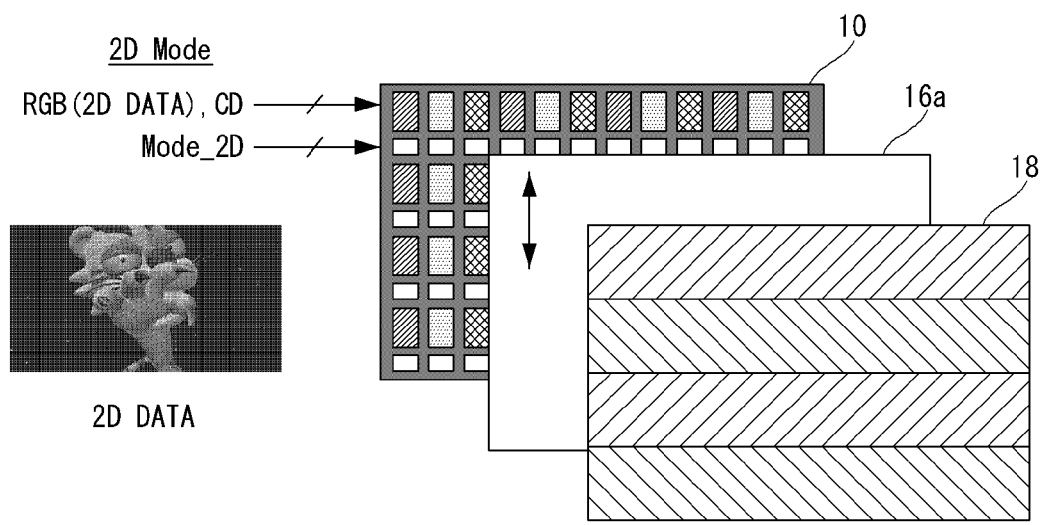
FIG. 17 is an exemplary schematic view illustrating the operation of the image display device in a 2D mode.

FIG. 17 is a schematic view illustrating the operation of the image display device in the 2D mode. As shown in FIG. 17, in the 2D mode (Mode_2D), RGB data voltages in the 2D data format are applied to the first fine subpixels disposed at the odd numbered horizontal lines of the image display panel 110, and the luminance compensation voltages (CD) are applied to the second fine subpixels disposed at the even numbered horizontal lines of the image display panel 110. Because the RGB image by the RGB data voltages has a 2D data format, it is transmitted through the patterned retarder 118 as is.

Luminance degradation in the 2D mode (Mode_2D) is minimized by the second fine subpixels to which the luminance compensation voltages (CD) are applied. In addition, because the patterned retarder 118 does not have black stripe patterns, moiré is not generated and thus, degradation of visibility of the 2D image can be prevented.

In the second exemplary embodiment of the present invention, the subpixels each are divided into the first and second fine subpixels, and in displaying a 2D image, the same RGB data voltages are applied to the first and second fine subpixels, and in displaying a 3D image, the RGB data voltages are applied to the first fine subpixels and the dark gray voltages are applied to the second fine subpixels. Accordingly, when the 3D image is displayed, the display interval of the left eye image and the right eye image can be secured by 200 μm, for example, even without black strip patterns, and thus, the up viewing angle range satisfying the critical value (e.g., 7%) of the 3D crosstalk can become about 0° to 7°, for example, as shown by a line 'B' in the graph of FIG. 12, without degrading the visibility and luminance of the 2D image.

As described above, the image display device according to the present invention can improve the visibility of both 2D and 3D images as well as minimizing the reduction in the luminance, in particular, in displaying a 2D image.

It will be apparent to those skilled in the art that various modifications and variations can be made in the image display device of the present invention without departing from the spirit or scope of the invention. Thus, it is intended that the present invention cover the modifications and variations of this invention provided they come within the scope of the appended claims and their equivalents.

What is claimed is:

1. An image display device, comprising:
an image display panel including a plurality of pixels configured to display a 2D image or a 3D image;
a driving circuit configured to apply a data voltage in a 2D image format or a data voltage in a 3D image format to the image display panel;
a controller configured to control the driving circuit in a 2D mode for displaying the 2D image or in a 3D mode for displaying the 3D image; and
a patterned retarder configured to convert light from the image display panel to alternately have a first polarization and a second polarization,
wherein each pixel includes first to fourth subpixels, which are disposed in two parallel lines, the fourth subpixel being disposed in a line different from a line in which the first to third subpixels are disposed, and wherein the data voltage in the 2D image format is applied to the first to third subpixels and a luminance compensation voltage is applied to the fourth subpixel in the 2D mode, while the data voltage in the 3D image format is applied to the first to third subpixels and a dark gray voltage is applied to the fourth subpixel in the 3D mode.

2. The image display device of claim 1, wherein a ratio of a vertical pitch of the fourth subpixel to a vertical pitch of the pixel is 1/3.

3. The image display device of claim 1, wherein:
the first polarization is a left circular polarization; and
the second polarization is a right circular polarization.

4. The image display device of claim 1, wherein the luminance compensation voltage is an average luminance value of the data voltage in the 2D image format applied to the first to third subpixels.

5. The image display device of claim 4, wherein the luminance compensation voltage is determined pixel by pixel.

6. The image display device of claim 1, wherein the patterned retarder includes a first retarder and a second retarder whose absorption axes are perpendicular to each other.

7. The image display device of claim 6, wherein:
the first retarder is formed at odd numbered lines of the patterned retarder and transmits light with the first polarization; and
the second retarder is formed at even numbered lines of the patterned retarder and transmits light with the second polarization.

8. The image display device of claim 1, wherein:
left eye images are sequentially displayed on the first to third subpixels disposed at (2i−1)th horizontal lines;
right eye images are sequentially displayed on the first to third subpixels disposed at (2i+1)th horizontal lines; and
i is a positive odd integer.

9. The image display device of claim 1, wherein the dark gray voltage is applied to the fourth subpixel disposed at even numbered horizontal lines of the image display panel in the 3D mode.

10. The image display device of claim 1, wherein the luminance compensation voltage is applied to the fourth subpixel disposed at even numbered horizontal lines of the image display panel in the 2D mode.

11. A liquid crystal display device, comprising:
an upper substrate, a lower substrate, and a liquid crystal layer therebetween;
a backlight unit including a light source configured to provide the light to an image display panel including a plurality of pixels configured to display a 2D image or a 3D image;
a lower polarizer disposed on the lower substrate;
an upper polarizer disposed on the upper substrate;
a color filter array including a black matrix and a color filter;
a driving circuit configured to apply a data voltage in a 2D image format or a data voltage in a 3D image format to the image display panel;
a controller configured to control the driving circuit in a 2D mode for displaying the 2D image or in a 3D mode for displaying the 3D image; and
a patterned retarder disposed configured to convert light from the image display panel to alternately have a first polarization and a second polarization,
wherein each pixel includes first to fourth subpixels, which are disposed in two parallel lines, the fourth subpixel being disposed in a line different from a line in which the first to third subpixels are disposed, and wherein the data voltage in the 2D image format is applied to the first to third subpixels and a luminance compensation voltage is applied to the fourth subpixel in the 2D mode, while the data voltage in the 3D image format is applied to the first to third subpixels and a dark gray voltage is applied to the fourth subpixel in the 3D mode.

12. An image display device, comprising:
an image display panel including a plurality of pixels configured to display a 2D image or a 3D image;
a driving circuit configured to apply a data voltage in a 2D image format or a data voltage in a 3D image format to the image display panel;
a controller configured to control the driving circuit in a 2D mode for displaying the 2D image or in a 3D mode for displaying the 3D image; and
a patterned retarder configured to convert light from the image display panel to alternately have a first polarization and a second polarization,
wherein each pixel includes first to fourth subpixels,
wherein the data voltage in the 2D image format is applied to the first to third subpixels and a luminance compensation voltage is applied to the fourth subpixel in the 2D mode, while the data voltage in the 3D image format is applied to the first to third subpixels and a dark gray voltage is applied to the fourth subpixel in the 3D mode, and
wherein the luminance compensation voltage is an average luminance value of the data voltage in the 2D image format applied to the first to third subpixels.

13. The image display device of claim 12, wherein:
the fourth subpixel is disposed to be a line adjacent and parallel to a same line to which the first, second, and third subpixels are disposed; and
a ratio of a vertical pitch of the fourth subpixel to a vertical pitch of the pixel is 1/3.

14. The image display device of claim 12, wherein:
the first polarization is a left circular polarization; and
the second polarization is a right circular polarization.

15. The image display device of claim 12, wherein the luminance compensation voltage is determined pixel by pixel.

16. The image display device of claim 12, wherein the patterned retarder includes a first retarder and a second retarder whose absorption axes are perpendicular to each other.

17. The image display device of claim 16, wherein:
the first retarder is formed at odd numbered lines of the patterned retarder and transmits light with the first polarization; and
the second retarder is formed at even numbered lines of the patterned retarder and transmits light with the second polarization.

18. The image display device of claim 12, wherein:
left eye images are sequentially displayed on the first to third subpixels disposed at (2i−1)th horizontal lines;
right eye images are sequentially displayed on the first to third subpixels disposed at (2i+1)th horizontal lines; and
i is a positive odd integer.

19. The image display device of claim 12, wherein the dark gray voltage is applied to the fourth subpixel disposed at even numbered horizontal lines of the image display panel in the 3D mode.

20. The image display device of claim 12, wherein the luminance compensation voltage is applied to the fourth subpixel disposed at even numbered horizontal lines of the image display panel in the 2D mode.

* * * * *